United States Patent [19]

Nallenweg et al.

[11] Patent Number: 4,961,652

[45] Date of Patent: Oct. 9, 1990

[54] RADIAL BEARING

[75] Inventors: Richard M. Nallenweg, Cherry Valley; Gerhardt E. Lichtfuss, Rockford, both of Ill.

[73] Assignee: Sundstrand Corporation, Rockford, Ill.

[21] Appl. No.: 169,228

[22] Filed: Mar. 16, 1988

[51] Int. Cl.$^5$ .............................................. F16C 17/03
[52] U.S. Cl. ..................................... 384/312; 384/416
[58] Field of Search ............... 384/309, 312, 311, 117, 384/306, 308, 416

[56] References Cited

U.S. PATENT DOCUMENTS

| | | | |
|---|---|---|---|
| 1,747,609 | 2/1930 | Treschow | 384/310 |
| 1,900,874 | 3/1933 | Wallgren . | |
| 1,900,875 | 3/1933 | Wallgren . | |
| 1,907,823 | 3/1933 | Janson . | |
| 1,915,275 | 6/1933 | Janson . | |
| 1,917,277 | 7/1933 | Wallgren et al. . | |
| 1,920,723 | 8/1933 | Wallgren | 384/309 |
| 1,920,724 | 8/1933 | Wallgren et al. . | |
| 1,920,725 | 8/1933 | Wallgren . | |
| 3,984,159 | 10/1976 | Jenness | 384/310 |

Primary Examiner—Lenard A. Footland
Attorney, Agent, or Firm—Wood, Phillips, Mason Recktenwald & Vansanten

[57] ABSTRACT

A radial-type bearing which includes an outer tube-like member rotatable about a center axis and having an inner cylindrical bearing surface. An inner shaft-like member is disposed within the outer rotatable member. The inner member is stationary or non-rotatable and is generally coaxial with the outer rotatable member. A plurality of bearing pads have operative positions radially between the outer and inner members. The bearing pads are pivotally mounted on the stationary inner member for tilting movement in response to rotation of the outer member. The pads have outer bearing surfaces complementary to the inner bearing surface of the outer rotatable member.

6 Claims, 1 Drawing Sheet

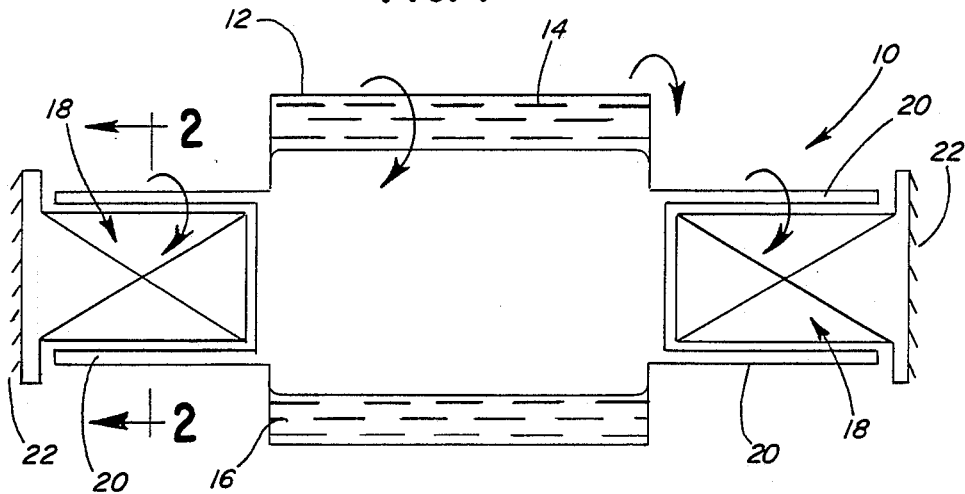
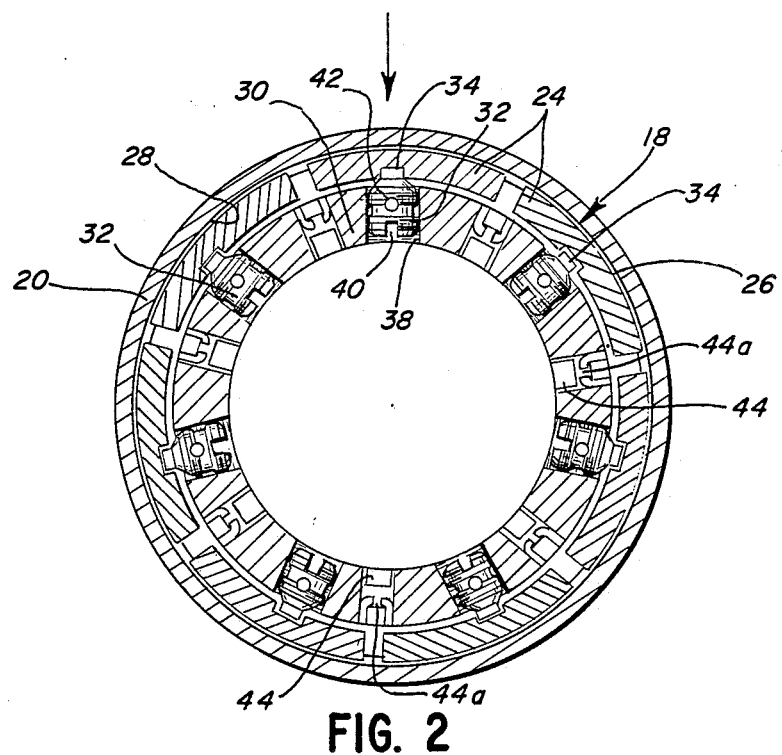

4,961,652

RADIAL BEARING

FIELD OF THE INVENTION

This invention generally relates to the art of bearings and, particularly, to a radial-type bearing which employs tilting bearing pads.

BACKGROUND OF THE INVENTION

It is known to construct radial bearings with a plurality of bearing blocks or pads radially disposed between relatively rotatable inner and outer members or in a "race". The bearing pads are arranged to tilt with respect to one of the members when the bearing is in operation to form wedge-shaped spaces for the reception of a film of load-sustaining lubricant. In other words, the wedge-shaped spaces open in the direction of movement of the bearing pads, in response to tilting, in order to form and retain the load sustaining film. The bearing pads generally are symmetrical so that relative rotation of the members in one direction causes tilting of the pads in one way and rotation in the other direction causes tilting of the pads in the other way.

In the prior art, such tilting pad radial bearings either have the pads mounted on the inside of an outer stationary member for engaging the outer cylindrical bearing surface of an inner rotatable member, or the pads have been mounted on the inner rotatable member itself for engaging the inside surface of the outer stationary member. Such uses have proven effective for their intended purposes when the inner member rotates, as with a shaft, within an outer stationery member, such as a tube having an inside cylindrical bearing surface.

However, there are other applications where rotatable members require bearing means in a very compact environment, such as in aerospace applications, and particularly in such environments as a space station. In such environments, where space is of an ultimate premium, to employ radial bearing pads on the outside of a rotatable member not only is undesirable in and of itself, but the necessary surrounding tube having an inner bearing surface requires space which simply may not be available, much less requiring an additional element for the bearing means.

This invention is directed to a novel radial bearing of the tilting pad type wherein the bearing is placed within the rotatable member itself. For instance, centrifugal drum-like pumps are employed in aerospace applications. Placing radial bearing pads about the outside of the drum would be undesirable and sometimes impossible because of space limitations. The invention is exemplified herein with such a centrifugal pump, wherein the bearing pads are employed inside the pump itself. Of course, other applications of the invention are readily available.

SUMMARY OF THE INVENTION

An object, therefore, of the invention is to provide a new and improved radial bearing of the type employing tilting bearing pads.

In the exemplary embodiment of the invention, the radial-type bearing includes an outer tube-like member rotatable about a center axis and having an inner cylindrical bearing surface. An inner shaft-like member is disposed within the outer rotatable member and is non-rotatable but disposed generally coaxial within the outer rotatable member. A plurality of bearing pads have operative positions radially between the outer and inner members. The bearing pads are pivotally mounted on the inner shaft-like member for tilting movement in response to rotation of the outer tube-like member. The bearing pads have outer bearing surfaces complementary to the inner bearing surface of the outer rotatable member.

It can be seen that by constructing the radial bearing within the rotatable member itself, extreme space limitations can advantageously be met where prior art radial bearings of the character described would be inapplicable.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a schematic illustration of a drum-like centrifugal pump employing radial bearings in accordance with the invention; and FIG. 2 is a section taken generally along line 2—2 of FIG. 1.

DETAILED DESCRIPTION OF THE PREFERRED EMBODIMENT

Referring to the drawings in greater detail, and first to FIG. 1, one application of the invention is illustrated in a centrifugal pump, generally designated 10. The pump is shown somewhat schematically in the drawing to comprise a drum-like configuration having a larger diameter portion 12 within which a liquid 14 is contained. A vapor space 16 is located radially inwardly of the liquid. The drum rotates, such as in the direction of arrow "A", whereby liquid 14 is forced outwardly under centrifugal action and thereby can be pumped for proper usage within an appropriate system.

For instance, centrifugal pump 10 may be used in a two-phase thermal management system, such as in a cooling system of a space station. Liquid 14 is centrifugally pressurized within the rotating drum and can be sent as a coolant to electrical components that are prone to excessive heating. Of course, the liquid could be used as a working fluid in other applications wherein space limitations are extremely critical. To this end, radial bearings, generally designated 18, are employed directly on the inside or within the rotating drum, particularly in reduced diameter end portions 20 of the drum. The bearings are stationary relative to the rotating drum, as indicated schematically by the grounding symbols 22. Of course, appropriate seals would be employed to prevent the escape of liquid from within the drum, past the bearings, particularly since the liquid would in essence be pressurized. The drum itself can be rotated relative to the stationary bearings by a variety of driving means, such as external ring gears or the like (not shown). It immediately can be seen that by providing the stationary bearings directly inside the rotating drum, exterior bearing components are completely eliminated and an extremely compact bearing system is provided, one which can meet critical space requirements that cannot be met by prior art radial bearings, even of the tilting pad type.

FIG. 2 shows in more detail one of the non-rotatable or stationary radial bearings 18 within reduced diameter portion 20 of the rotating drum. The bearing includes a plurality of bearing pads 24 which generally are shaped in cylindrical segments having outer bearing surfaces 26 of a cylindrical configuration complementary to an inner cylindrical bearing surface 28 of rotating drum portion 20. The bearing pads are pivotally mounted on an inner stationary or non-rotatable shaft-like member 30 by mounting members 32 defining a pivot point 34 for each respective bearing pad. Therefore, the pads can tilt about pivot points 34 in response to rotation of the outer rotatable member 20. Upon rotation of drum portion 20, wedge-shaped spaces thereby are formed between bearing pads 24 and inner cylindrical surface 28 of rotatable drum portion 20 for the reception of a film of load-sustaining lubricant. In essence, pivots 34 define fulcrums for the bearing pads. The pads each are asymmetrical since rotation is desired in only one direction. This maximizes film thickness.

In addition, "unloaded" bearing pads can have a tendency to flutter which is undesirable from the pivot standpoint. Instability also can arise when pad pitch inertias are high enough to prevent adequate tracking of outer rotatable drum portion 20. Both of these potential instabilities can be substantially reduced by "geometric preloading" of the bearing. This is accomplished by making the radius of curvature of outer bearing surface 26 of bearing pads 24 less than the radius of curvature of inner bearing surface 28 of rotating drum portion 20, even though the thicknesses of the bearing pads may be uniform. This creates a tapered gap or converging clearance wedge between the pads and the drum portion. The outer bearing surface 26 of each pad thereby is closest to inner bearing surface 28 substantially in line with the respective pivot 34. This technique sets the bearing pads closer to bearing surface 28 than could be dictated by machining tolerances. This has the same effect as applying an external load.

Another feature of the invention is shown in FIG. 2. Each of mounting members 32 can be adjusted to position the bearing surface of its respective bearing pad 24 at a precise radial location from the center of radial bearing 18. Specifically, each member 32 is threaded into a threaded bore 38 in shaft-like member 30. A socket 40, such as a screw driver slot or hex socket or the like, is provided in the radial inner end of mounting member 32. Therefore, an appropriate tool can be used to rotate mounting member 32 in bore 38 and effectively move the respective pivot point 34 in a radial direction, either outwardly or inwardly. This positions bearing pads 24 at appropriate or desired locations.

Precise radial adjustment of bearing pads 24 by the means described above is accomplished by providing an outer cylindrical member (not shown) that corresponds dimensionally to rotatable drum portion 20, in the form of a jig or fixture that, in essence, mimics the supported cylindrical member with which bearing pad 18 is to be used in final assembly. Close tolerances of the jig or fixture are maintained in relation to the final assembly cylindrical member. The bearing pads each are threaded outwardly until it is in appropriate contact with the inner cylindrical surface of the jig. This is accomplished by using a tool in socket 40 of threaded member 32. When the final position for each pad is determined in this manner, holes are drilled axially through member 32 and the adjacent wall structure of bore 38 and a pin 42 is inserted through the hole to lock it in position, such as is used with dowel-type pins. After each of the pads is thus positioned, the pins are removed and the radial bearing assembly is disassembled and reassembled into its final structure, such as within rotatable drum portion 20. At that point, mounting members 32 again are threaded into their appropriate positions to align the dowel hole and pins 42 are reinserted to hold the mounting member in these correct positions, i.e. precisely locating the radial positions of pivot points 34 and their respective bearing pads 24.

Lastly, lubrication holes 44 are provided radially through shaft 30 whereby a lubricating liquid can be provided from a radially inward position to flow radially outward through lubricating holes or channels 44 toward the mating bearing surfaces of bearing pads 24 and drum portion 20. A small orifice 44a is provided in each of lubricating channels 44 and the lubricating liquid is sprayed radially outwardly through the gaps between the ends of adjacent bearing pads 24.

In addition to meeting such critical space limitations as in aerospace applications, the use of a tilting pad bearing within a rotatable member, such as the liquid pump drum, advantage is taken of the inherent self-aligning capability of the tilting pads. This eliminates alignment problems common to rigid bearings, which problems often cannot otherwise be compensated for in compact aerospace environments.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A radial-type bearing for a centrifugal pump, comprising:

means for saving space including an outer drum-like member rotatable about a center axis and containing a fluid for pumping under centrifugal action in response to rotation of the drum-like member, the member having axial ends, an inner cylindrical bearing surface and an outer surface;

an inner shaft-like member within said portion of the rotatable drum-like member and being non-rotatable and generally coaxial with the outer rotatable member; and a plurality of bearing pads having operative positions radially between the inner stationary member and the inner cylindrical bearing surface of the rotatable drum-like member, the bearing pads being pivotally mounted on the inner member for tilting movement in response to rotation of the drum-like member and having outer bearing surfaces complementary to the inner bearing surface of the rotatable drum-like member, each said bearing pad residing radially within the outer surface of the drum-like member over that portion of each said bearing pad that is in axial coincidence with the drum-like member, whereby said drum-like member, shaft-like member and bearing pads can be assembled into a system wherein the outer surface of the drum-like member is the radially outermost portion of said system between the axial ends of the drum-like member.

2. The radial-type bearing of claim 1 wherein each of said bearing pads are preloaded by forming the pad with an outer bearing surface having a radius of curvature less than that of said inner bearing surface of the outer rotatable member to provide a tapered gap therebetween.

3. The radial-type bearing of claim 1 wherein said bearing pads are pivotally mounted on the inner member intermediate opposite circumferential ends of the pads.

4. A radial-type bearing for a centrifugal pump, comprising:

a rotatable drum-like member containing a fluid for pumping under centrifugal action in response to rotation of the drum-like member, the drum-like member including a portion having an inner cylindrical bearing surface;

an inner stationary member within said portion of the rotatable drum-like member generally concentric thereto; and a plurality of bearing pads having operative positions between the inner stationary member and the inner cylindrical bearing surface of the rotatable drum-like member, the bearing pads being pivotally mounted on the inner stationary member for tilting movement in response to rotation of the drum-like member and having outer bearing surfaces complementary to the inner bearing surface of the rotatable drum-like member.

5. The radial-type bearing of claim 4 wherein said bearing pads are pivotally mounted on the inner stationary member intermediate opposite circumferential ends of the pads.

6. The radial-type bearing of claim 5 wherein each of said bearing pads are preloaded by forming the pad with an outer bearing surface having a radius of curvature less than that of said inner bearing surface of the outer rotatable member to provide a tapered gap therebetween.

* * * * *